United States Patent
Barker et al.

(10) Patent No.: US 6,307,833 B1
(45) Date of Patent: Oct. 23, 2001

(54) RAIN FADE MITIGATION IN A DATA TRANSMISSION SYSTEM

(75) Inventors: Keith R. Barker, Belmont; Mark T. Rafter, Los Gatos, both of CA (US)

(73) Assignee: Loral CyberStar, Inc., Rockville, MD (US)

(*) Notice: Subject to any disclaimer, the term of this patent is extended or adjusted under 35 U.S.C. 154(b) by 0 days.

(21) Appl. No.: 09/249,895

(22) Filed: Feb. 16, 1999

(51) Int. Cl.[7] ............................................. H04L 1/00
(52) U.S. Cl. ...................................... 370/216; 455/505
(58) Field of Search ...................................... 370/216, 317, 370/350, 519, 428, 349; 455/503, 504, 505, 506, 519; 375/347; 714/746, 774, 786

(56) References Cited

U.S. PATENT DOCUMENTS

| | | | |
|---|---|---|---|
| 3,842,352 | * 10/1974 | Cote | 455/504 |
| 4,099,121 | * 7/1978 | Fang | 375/267 |
| 4,298,984 | * 11/1981 | Baker | 375/267 |
| 5,745,532 | * 4/1998 | Campana, Jr. | 375/347 |
| 5,822,310 | * 10/1998 | Chennakeshu et al. | 370/317 |
| 5,850,419 | * 12/1998 | Todoroki et al. | 375/267 |
| 5,883,581 | * 3/1999 | Dorenbosch et al. | 340/825.44 |
| 6,028,853 | * 2/2000 | Haartsen | 370/338 |

* cited by examiner

Primary Examiner—Chau Nguyen
Assistant Examiner—D. Trinh
(74) Attorney, Agent, or Firm—Kenneth W. Float

(57) ABSTRACT

Rain fade mitigation methods and data broadcast systems that provide improved performance in a rain fade environment. The systems distribute data derived from a transmitting processor by way of a data distribution system to one or more receivers located at remote locations. The transmitting processor may include forward error correction processing software that is used to add forward error correction bits to data packets to be transmitted. When error correction bits are added to the data prior to transmission, the receivers include forward error correction software that processes the received data packets to reconstruct the original data. Data packets with or without error correcting bits may be transmitted two times to the remote locations, which times are separated by a time delay having a duration that is related to a rain fade event, which time delay is sufficient to allow data reconstruction in the presence of the rain fade event. The data packets may also be transmitted to the remote locations at a relatively slow transmission rate such that the time required to transmit the data to the one or more remote locations is greater than or equal to the time necessary to transmit the data plus the amount of time equal to an average rain fade event. The data packets are received at the remote locations and appropriately processed to reconstruct the original data.

6 Claims, 2 Drawing Sheets

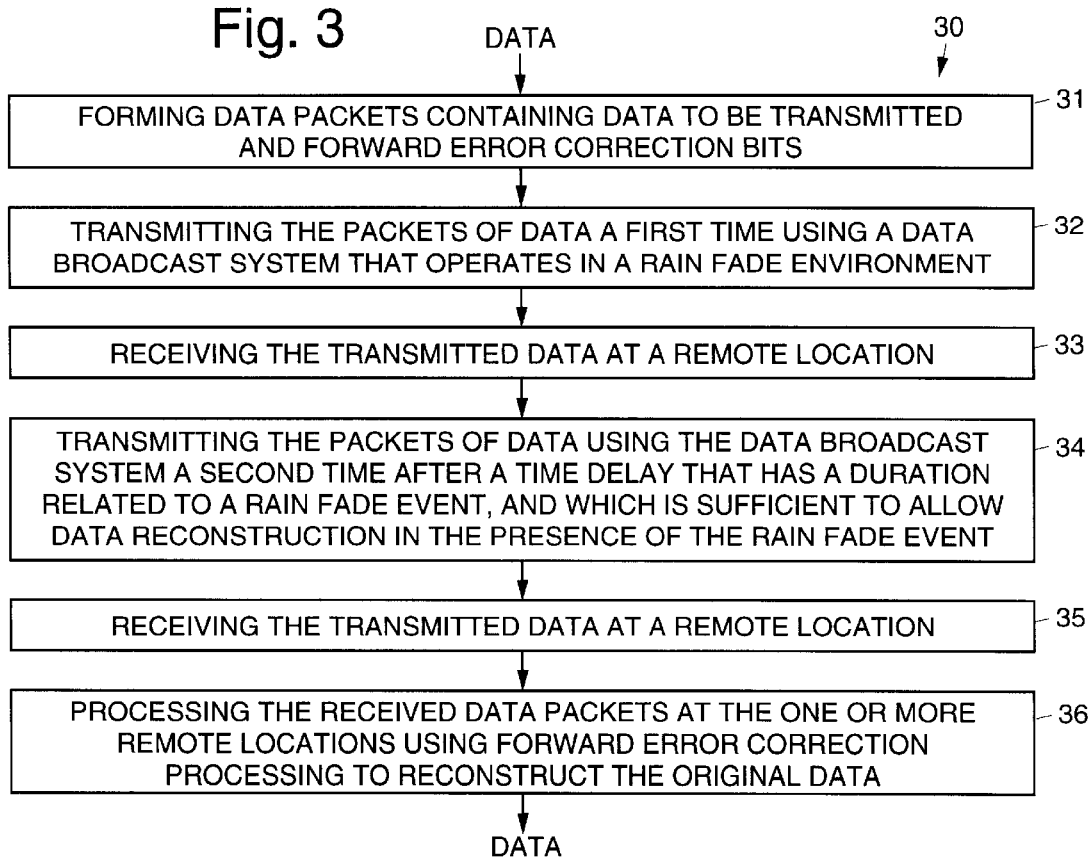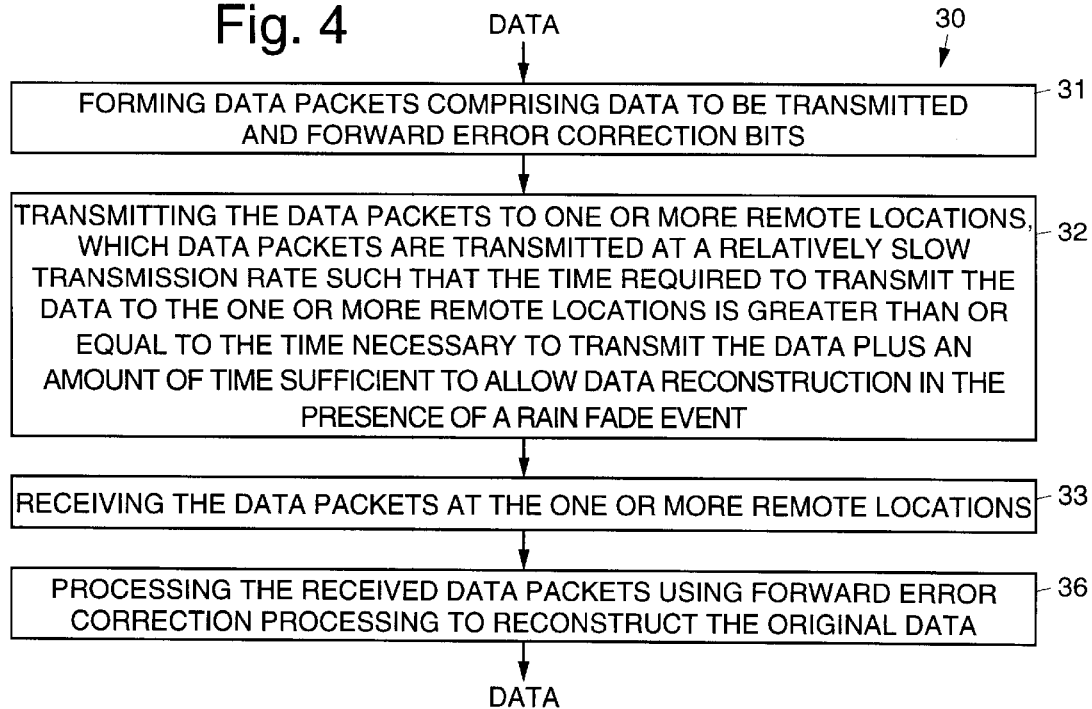

RAIN FADE MITIGATION IN A DATA TRANSMISSION SYSTEM

BACKGROUND

The present invention relates generally to data distribution systems and methods, and more particularly, to an improved rain fade mitigation method and data distribution system that distributes data to personal computers.

The assignee of the present invention has developed a satellite-based data distribution system that is used to distribute data from content providers to client personal computers by way of a satellite. This system must reliably operate in the presence of rain.

One currently deployed data broadcasting system, known as the DirecPC™ system developed by Hughes Network Systems, for example, is believed to provide for rain fade mitigation. However, the specifics of the rain fade mitigation is not known. However, such rain fade mitigation is not as critical when transmitting video data. This is because in most cases, the loss of data typically does not result in a complete interruption in transmission. If some data is lost during transmission, the video image may be deteriorated, but the eyes and brain integrate what is displayed making the data loss relatively unnoticeable.

It would be an improvement to have a rain fade mitigation method and one way data distribution system that operates in a rain fade environment. It would also be an improvement to have a rain fade mitigation method and one way satellite-based data distribution system that distributes data to personal computers in a rain fade environment.

SUMMARY OF THE INVENTION

The present invention provides for a rain fade mitigation method and data distribution system, such as an RF or satellite-based data distribution system, that provides improved performance when the system operates in a rain fade environment. The present invention may be used with any microwave RF transmission system in which rain events degrade or attenuate the communications signal. Typical systems include satellite-based communications, and the like.

In a first embodiment, the system includes a transmitting processor that processes data packets comprising data to be transmitted. A data distribution system is used to transmit the data packets to one or more receivers located at remote locations. The data distribution system is used to transmit the data a first time. The data is then transmitted a second time after a time delay that is nominally equal to the duration of an average rain event. This time is on the order of 20–30 minutes. The receivers receive the data packets and recover the originally transmitted data.

In a second embodiment, the transmitting processor also comprises forward error correction processing software that adds forward error correction bits to data packets containing the data to be transmitted. The data distribution system is used to transmit the data packets to one or more receivers located at remote locations. The packets are transmitted two or more times with a time delay between transmissions that is nominally equal to the duration of an average rain event. The receivers receive the transmitted packets, and also comprise forward error correction software that processes the received data packets to reconstruct the original data. The number of forward error correction bits added to each packet is configurable, and is typically up to about fifty percent of the number of bits in the data packet.

In a third embodiment, the data packets include forward error correction bits and are transmitted one time at a relatively slow transmission rate. The data transmission rate is chosen so that the time required to transmit the data to the receiver is greater than or equal to the time necessary to transmit the data plus the amount of time equal to an average rain fade event (20–30 minutes).

The approaches implement by the present invention provide for more efficient overall data transfer and the ability to transfer large data files more efficiently than previous systems. The use of additional forward error correction bits (overhead) in the data packets transmitted to the client personal computers also allows the system to have a reduced bandwidth and reduced data transmission rate.

The present invention may add up to fifty percent additional overhead to the data packets. This allows the loss of fifty percent of the data while still allowing the data to be recovered at the client personal computers. This technique ensures reception of the transmitted data in a rain fade environment.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 illustrates a second exemplary embodiment of a rain fade mitigation method in accordance with the principles of the present invention; and FIG. 4 illustrates a third exemplary embodiment of a rain fade mitigation method in accordance with the principles of the present invention.

DETAILED DESCRIPTION

Figure 1:
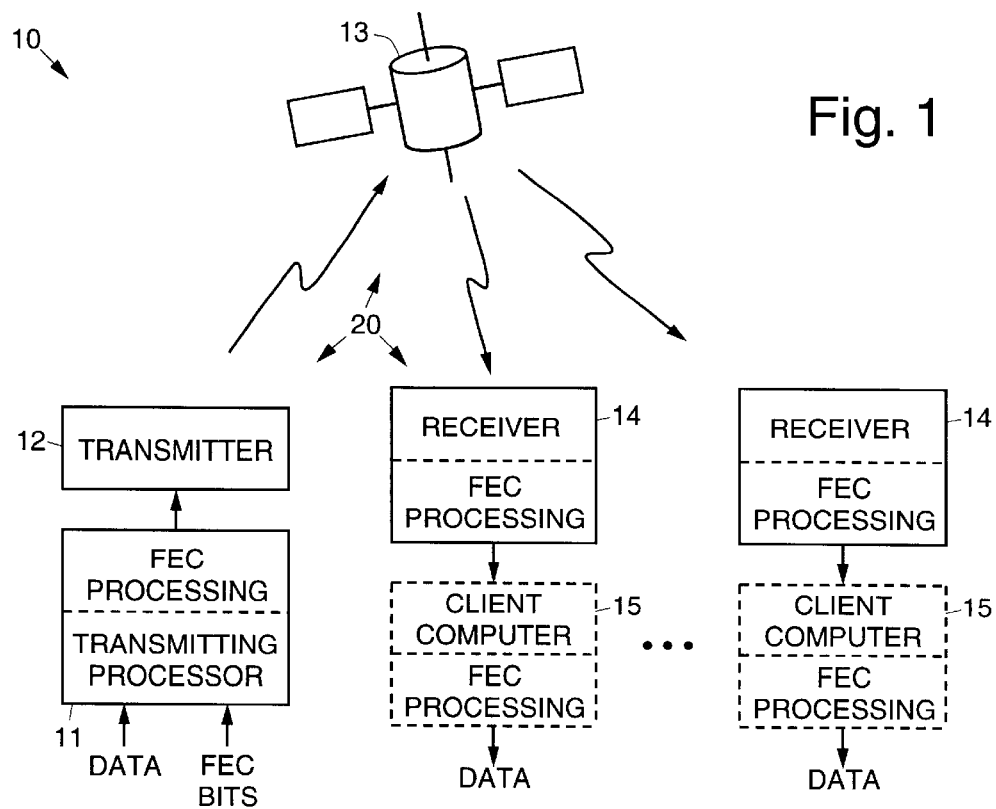
FIG. 1 illustrates an exemplary satellite-based data broadcasting system for distributing data to personal computers.

Referring to the drawing figures, FIG. 1 illustrates an exemplary satellite-based data broadcasting system 10 in which rain fade mitigation methods 30 (FIGS. 2–4) in accordance with the principles of the present invention may be employed. The system 10 is designed to distribute data derived from a transmitting processor 11 by way of a data distribution system 20 to one or more client personal computers 15 (or server computers 15) that are remotely located from the transmitting processor 11. The data distribution system 20 may comprise an RF or satellite-based data distribution system, for example. FIG. 1 illustrates a typical satellite-based data distribution system employing a satellite 13.

The transmitting processor 11 may include forward error correction (FEC) processing software that is used to add forward error correction bits to data packets containing data to be transmitted. The data distribution system 20 comprises a transmitter 12 that is part of or coupled to the transmitting processor 11 and that is used to transmit, or uplink, the packets containing the data (and forward error correction bits) to the satellite 13. The satellite 13 retransmits, or downlinks, the data packets to one or more receivers 14 that are respectively coupled to or are contained in one or more client personal computers 15. When error correction bits are added to the data prior to transmission, the receivers 14 or client personal computers 15 include forward error correction software that processes the received data packets to reconstruct the original data.

Figure 2:
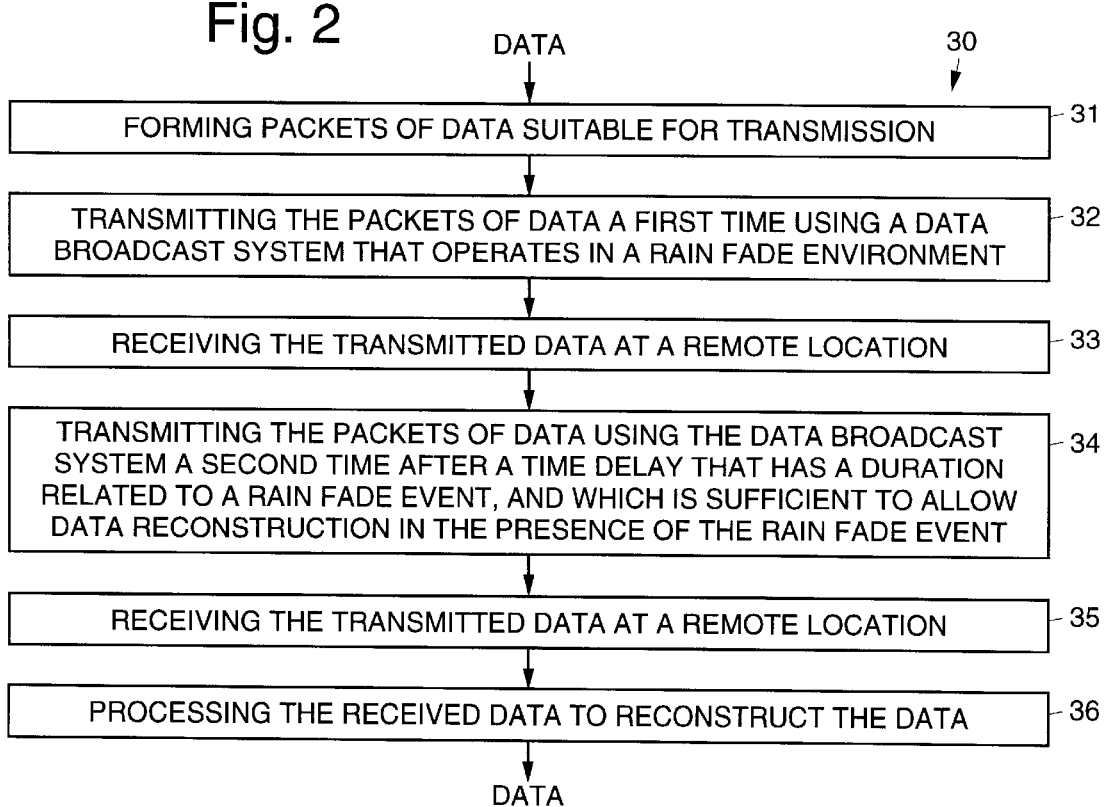
FIG. 2 illustrates a first exemplary embodiment of a rain fade mitigation method in accordance with the principles of the present invention.

Details of the various systems 10 and methods 30 of the present invention will be described in more detail with reference to FIGS. 2–4. FIG. 2 illustrates a first exemplary embodiment of a rain fade mitigation method 30 in accordance with the principles of the present invention. The first exemplary rain fade mitigation method 30 comprises the following steps and is implemented in the system 10 as follows.

In the first embodiment of the method 30 and system 10, the transmitting processor 11 processes the data to form 31 data packets containing data to be transmitted. The data distribution system 20 is used to transmit 32 the data packets a first time to one or more receivers 14 that are respectively coupled to or are contained in one or more client personal computers 15 (server computers 15) located at remote locations. The receivers 14 receive 33 the transmitted data packets. The data distribution system 20 is used to transmit 34 the data packets a second time after a time delay having a specified duration that is related to a rain fade event and which is sufficient to allow data reconstruction in the presence of the rain fade event. The average time delay is typically on the order of 20–30 minutes. The delay is adjusted to account for local rain conditions. The receivers 14 receive 35 the data packets that were transmitted the second time. The receivers 14 or client personal computers 15 process the data packets transmitted both times to recover or reconstruct 36 the originally transmitted data.

In a second embodiment of the system 10 and method 30 illustrated with reference to FIGS. 1 and 3, the transmitting processor 11 processes the data to form 31 data packets containing data to be transmitted and further comprises forward error correction processing software that adds forward error correction bits to the data packets that are to be transmitted. The data distribution system transmits 32 the data packets a first time to one or more receivers 14 that are respectively coupled to or are contained in one or more client personal computers 15 located at the remote locations. The data packets containing the data and forward error correction bits are transmitted 32, 34 a second time after a time delay having a duration that is related to a rain fade event and which is sufficient to allow data reconstruction in the presence of the rain fade event. The delay is adjusted for local rain conditions. The receivers 14 receive 33, 35 the transmitted packets, and the receivers 14 or client personal computers 15 also comprise forward error correction software that processes the received data packets to reconstruct 36 the original data. The number of forward error correction bits added to each packet is configurable, and is typically up to about fifty percent of the number of bits in the data packet.

In a third embodiment of the system 10 and method 30 illustrated with reference to FIGS. 1 and 4, the transmitting processor 11 processes the data to form 31 data packets containing data to be transmitted and further comprises forward error correction processing software that adds forward error correction bits to the data packets that are to be transmitted. The data packets are transmitted 32 one time at a relatively slow transmission rate. The data transmission rate is chosen so that the time required to transmit the data to the one or more receivers 14 or client personal computers 15 is greater than or equal to the time necessary to transmit the data plus the amount of time having a duration that is related to a rain fade event and which is sufficient to allow data reconstruction in the presence of the rain fade event. The time delay corresponding to an typical rain fade event in many parts of the United States is on the order of 20–30 minutes. Of course, the delay is adjusted for local rain conditions. The receivers 14 receives 33 the transmitted packets, and forward error correction software contained in the receivers 14 or client personal computers 15 processes the received data packets to reconstruct 36 the original data.

Typically, the additional forward error correction bits that are added to the data packets are on the order of fifty percent of the data bits in each packet. However, it is to be understood that the overhead provided by the additional forward error correction bits is configurable depending upon the application and the amount of rain fade mitigation that is required.

Assuming, for example, that fifty percent overhead is added to the data packets, and one third of the data in each packet comprises forward error correction bits, up to fifty percent of the transmitted data may be lost due to the effects of rain, and the original data may still be reconstructed. If the data is transmitted over a one hour period and a rain storm lasts 20 minutes, all of the original data may be reconstructed. The present invention thus ensures reception of the transmitted data in a rain fade environment.

Thus, rain fade mitigation systems and methods for use in data distribution systems have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A data broadcast system for distributing data to one or more remote locations in a rain fade environment, comprising:

a transmitting processor for forming data packets comprising data to be transmitted and forward error correction bits;

a data distribution system for transmitting the data packets to one or more receivers located at remote locations, which data packets are transmitted at a relatively slow transmission rate such that the time required to transmit the data to the one or more receivers is greater than or equal to the time necessary to transmit the data plus an amount of time sufficient to allow data reconstruction in the presence of a rain fade event, and the receivers receiving the data packets and processing the received data packets using forward error correction processing to reconstruct the original data.

2. The system recited in claim 1 wherein the data broadcast system comprises a satellite.

3. The system recited in claim 1 wherein the data broadcast system comprises an RF data broadcast system.

4. The system recited in claim 1 wherein the number of forward error correction bits added to each packet is configurable.

5. A rain fade mitigation method for distributing data to one or more remote locations in a rain fade environment, comprising the steps of:

forming data packets comprising data to be transmitted and forward error correction bits;

transmitting the data packets and forward error correction bits to one or more remote locations, which data packets are transmitted at a relatively slow transmission rate such that the time required to transmit the data to the one or more receivers is greater than or equal to the time necessary to transmit the data plus an amount of time sufficient to allow data reconstruction in the presence of a rain fade event;

receiving the data packets and forward error correction bits at the one or more remote locations; and forward error correction processing the received data pas packet and forward error correction bits to reconstruct the original data.

6. The method recited in claim 5 wherein the number or forward error correction bits added to each packet is configurable.

* * * * *